US006775068B2

(12) United States Patent
Lomas et al.

(10) Patent No.: US 6,775,068 B2
(45) Date of Patent: Aug. 10, 2004

(54) INTEGRATED OPTICAL CHANNEL

(75) Inventors: Stuart John Lomas, Edmonton (CA); Dean Edward McLaughlin, Baltimore, MD (US)

(73) Assignee: BigBandwidth Inc., Edmonton (CA)

( * ) Notice: Subject to any disclaimer, the term of this patent is extended or adjusted under 35 U.S.C. 154(b) by 15 days.

(21) Appl. No.: 10/289,475

(22) Filed: Nov. 6, 2002

(65) Prior Publication Data

US 2004/0085651 A1 May 6, 2004

(51) Int. Cl.⁷ .............................. G02B 27/10; G02B 6/26
(52) U.S. Cl. ........................................ 359/619; 385/16
(58) Field of Search ............................... 385/18, 33, 15, 385/16, 17; 359/619, 290, 291

(56) References Cited

U.S. PATENT DOCUMENTS

| | | | |
|---|---|---|---|
| 4,809,204 A | * 2/1989 | Dagenais et al. | ........... 708/191 |
| 5,037,173 A | * 8/1991 | Sampsell et al. | ............. 385/17 |
| 5,255,332 A | 10/1993 | Welch et al. | |
| 5,283,843 A | 2/1994 | Olmstead | |
| 5,960,132 A | 9/1999 | Lin | |
| 6,005,998 A | 12/1999 | Lee | |
| 6,198,858 B1 | 3/2001 | Pan et al. | ...................... 385/24 |
| 6,246,812 B1 | 6/2001 | Liu et al. | ...................... 385/34 |
| 6,263,133 B1 | 7/2001 | Hamm | ......................... 385/33 |
| 6,366,715 B1 | 4/2002 | Wang | |
| 6,370,422 B1 * | 4/2002 | Richards-Kortum et al. | ......................... 600/478 |
| 6,591,042 B2 * | 7/2003 | Tatah | .......................... 385/43 |

OTHER PUBLICATIONS

Upton, Robert S. et al., *Modeling Coherent Propagation Aids Accurate Coupling*, 3 pages, Jun. 2001, WDM Solutions.
Kennedy, Timothy P., *Understanding Ball Lenses*, 3 pages, 2001, Edmund Industrial Optics.
Scussat, Marco et al., *Optical Surface Mounted Devices (SMD)*, 3 pages, 2001, High Precision Robotics Group.
Lee, Shi–Sheng et al., *2×2 MEMS Fiber Optic Switches with Silicon Sub–Mount for Low–Cost Packaging*, 4 pages, 1998, UCLA.
Huang, Long–Sun et al., *MEMS Packaging for Micro Mirror Switches*, 6 pages, 1998, UCLA.
"Optics: Ball Lenses,"<http://ourworld.compuserv.com/homepages/awi_industries/Optic_BallLens.htm>[retrieved Feb. 15, 2002] publicly available prior to Nov. 6, 2002, AWI Industries.

* cited by examiner

Primary Examiner—Ricky Mack
(74) Attorney, Agent, or Firm—Christensen O'Connor Johnson Kindness PLLC

(57) ABSTRACT

An apparatus and method that provides for improved optical communication between at least one source and at least one destination, with reduced loss of power and superior retention of the quality of a signal when compared with the prior art. The apparatus has a body having at least one integrated optical channel along which a light signal is transmitted via an N-fold plurality of lenses. A light signal transmitted along the integrated optical channel is repeatedly refocused along the optical axis and is then highly focused at the second end. Optionally, the light signal can be switched, attenuated, filtered, tapped or monitored by positioning appropriate optical devices between the lenses.

40 Claims, 13 Drawing Sheets

(L3a + L4a) = (L3b + L4b) = L1

INTEGRATED OPTICAL CHANNEL

FIELD OF THE INVENTION

The invention relates to an integrated optical channel having superior performance for transmitting optical signals between at least one source and at least one destination when compared with the prior art, an improved method of transmitting optical signals between a source and one or more destinations, and an optical switch and method for switching optical signals, in which said integrated optical channel confers the advantages of transmission of signals with reduced loss of power and enhanced retention of signal quality when compared with the prior art.

BACKGROUND OF THE INVENTION

The performance of fiber optic communication systems is dependent on the strength of a signal that can be transmitted along a length of optical fiber in an optical communication channel and retention of the quality of the signal during transmission. A signal that has lost a portion of its strength during transmission must be boosted to recover that strength before further transmission, or else the signal will be too weak to be detected or understood after transmission. Similarly, the quality of the signal must be retained if it is to be clearly understood. Losses in signal strength and quality can occur when a signal is communicated between a source and a destination along a connecting optical channel. A connecting optical channel can include one or more devices such as an optical switch, a monitor, a tap, an attenuator and a filter. Presently, transmission of an optical signal through a device such as an optical switch can cause a significant loss in signal strength, especially when an optical signal emitted from one optical fiber is redirected to another optical fiber by transmission via several reflectors or refractors between the optical fibers. Consequently, there is a need to improve capability to transmit a signal through optical channels having one or more reflective and/or refractive devices therein.

When an optical device that is a refractor, such as a lens, or a reflector, such as a mirror, is situated within an optical channel, there is an insertion loss of strength of an optical signal that is transmitted via that device. A state of the art optical channel typically contains two lenses for collimating and directing an optical signal transmitted in free space through that optical channel, for example from a first optical fiber to a second optical fiber. Losses in strength of an optical signal can also arise, for example, from dispersion of the collimated beam.

SUMMARY OF THE INVENTION

What is required is an improved method and apparatus for transmitting fiber optic signals between a source and a destination. What is also required is an improved method and apparatus for switching and/or monitoring optical communications between a source and a destination.

According to the PRIOR ART, in an optical channel connecting an optic fiber with a light receiving device, a light signal that is emitted from a distal end of an optic fiber is collimated in order to be transmitted along an optical channel with a high degree of retention of signal strength and quality. Apparatus and methods for collimating a signal beam are described in, for example, U.S. Pat. No. 6,198,858, issued to Pan et al. in 2001, U.S. Pat. No. 6,246,812, issued to Liu and Chang in 2001, and U.S. Pat. No. 6,263,133, issued to Hamm in 2001. We have found that there is no need to use any of these complex means for collimating an optical signal beam when using the apparatus and method of the present invention, and so the present invention offers advantages of simplicity of construction and operation, and hence reduced cost.

We have found that, by aligning several lenses in a regular pattern along an optical axis of an optical channel, insertion losses can be greatly reduced and a signal beam can be transmitted along said optical channel with high retention of optical signal strength and quality.

According to one aspect of the present invention there is provided a first embodiment of an apparatus providing a body having at least one first optical channel and an N-fold first plurality of lenses, the lenses having substantially similar sizes and optical properties. The N-fold plurality of lenses are spaced at regular intervals L1 along a first optical axis extending in a straight line between the first end and the second end of the optical channel. A first lens is distanced by L2 from the first distal end of a source, such as a first optical fiber, situated at a first end of the first optical channel. L2 is about one-half of L1. According to theoretical calculations, ideally L2 is exactly one-half of L1 for a lens having perfect optical properties. When the first optical channel is a through channel, a second lens is distanced by L2 from the second distal end of a destination such as a second optical fiber situated at a second end of the first optical channel. Values of L1 and L2 are selected so that a light signal transmitted at one of the first end and the second end of the first optical channel is refocused by each of the succession of lenses to form a regular (N−1-fold plurality of waists along the first optical axis, one of waists being situated between each pair of the plurality of lenses, and finally is focused at the other of the first and the second end.

According to another aspect of the present invention there is provided a second embodiment of the apparatus which is similar to the first embodiment except that the spacings between successive ones of the N-fold plurality of lenses in the first optical channel comprise a regular repeating pattern of two different spacings L' and L" along the first optical axis. The pattern is such that a light signal transmitted at one of the first end and the second end of the first optical channel is refocused by each of the succession of lenses and finally focused at the other of the first end and the second end.

According to yet another aspect of the present invention there is provided a third embodiment of the apparatus which is similar to the first and the second embodiments except that the N-fold plurality of lenses in the first optical channel comprises more than one sets of lenses, the lenses within any one set having closely similar properties. The lenses are aligned in a regular pattern along the optical axis of the first optical channel, the pattern being such that a light signal transmitted at one of the first end and the second end of the first optical channel is refocused by each of the succession of lenses to form a (N−1)-fold sequence of waists, one of which is between each pair of the plurality of lenses, and finally is focused at the other of the first end and the second end.

According to another aspect of the present invention there is provided a method for transmitting fiber optic signals between a source and at least one destination in which at least one of the first, second and third embodiments of the apparatus is provided as described above. A transmitting end of the source is at the first distal end of a first optical fiber situated at the first end of the first optical channel. A receiving end of the destination is at the second distal end of a second optical fiber of the first optical channel. The first optical fiber and the second optical fiber are in optical communication through the first optical channel. The positions of the lenses are selected so that a light signal emitted from the first distal end of the first optical fiber is continuously refocused by each of the succession of lenses and is then focused at the second distal end of the second optical fiber. The light signal transmitted via this arrangement of lenses has a high retention of signal quality and a low insertion loss between the source and the destination.

Although beneficial results may be obtained through the use of the apparatus for either transmitting an optical signal or switching an optical signal, as described above, it has been found that loss of strength and loss of coherence of the signal beam through dispersion between lenses are both minimized when first length L1 has a value that is not greater than four times the focal length of any one of the lenses.

Although beneficial results may be obtained through the use of the apparatus, as described above, it has been found that, when each apparatus described above is to be used for fiber optical communications, said apparatus preferably is manufactured by a process comprising a combination of micromachining and/or etching the shape of the movable portions and the base from a monolithic wafer. Manufacturing the apparatus from a monolithic wafer conveys several advantages, especially for the manufacture of the micro-optical path switches required for switching an optical signal between one optical fiber and another optical fiber according to the method of the present invention. One advantage is that all the components so manufactured can be made from a single substrate, and so can be very accurately situated relative to each other. Thus there is no need to assemble the movable portions and the base to construct the apparatus. Another advantage is that several of the apparatus can be made from a single monolithic wafer. Yet another advantage is that an array of plurals of the apparatus, and when necessary ancillary apparatus, can be manufactured simultaneously from a single wafer. It has been found that the apparatus can be manufactured by micromachining and/or etching a monolithic wafer comprising, as a non-limiting example, a first layer that is silicon, a second layer that is silicon dioxide and a third layer that is again silicon. When the movable portion is a portion of the first layer and the base includes the third layer, the portion of the second layer that is situated between the movable portion and the base can be removed by etching the silicon dioxide, thereby allowing the movable portion to move relative to the base. It will be recognized by one skilled in the art that monolithic wafers other than that used as an example above can be used, including combinations of layers of silicon and silicon nitride, and combinations of elements other than silicon and compounds other than compounds of silicon.

Beneficial results may be obtained through the use of the apparatus, as described above, when the lenses are any one of conventional refractive elements. It has been found that choosing ball lenses as the lenses of the invention provides convenience in implementing the invention. In the particular case when the lenses are ball lenses, it has been found that beneficial results are obtained when the first lens is spaced from the first distal end of the first optical fiber by a second length L2 that is about 5% less than one-half of first length L1. When L2 is about 5% less than one-half the length of L1, an improvement in the quality of the light signal transmitted along the first optical channel is achieved by reduction of the impact of spherical aberration arising from the shape of the ball lenses. A similar effect has also been found for another application of ball lenses, as described by Upton and Koshel in "*Modeling coherent propagation aids accurate coupling*", in the June, 2001 issue of *WDM SOLUTIONS*, published by PennWell Corporation.

Although beneficial results may be obtained through the use of the apparatus, as described above, wherein the lenses are ball lenses, even more beneficial results are obtained when the ball lenses have an anti-reflective coating to reduce scattering of light.

The principals of application of ball lenses for fiber optical communications are described by Kennedy in "*Understanding Ball Lenses*", an article at the commercial web site http://www.edmundoptics.com/techsupport/DisplayArticle.cfm?articleid=245. Ball lenses having full-surface anti-reflective coating are described in the commercial web site http://ourworld.compuserve.com/homepages/awi_industries/Optic_ballLens.htm.

DETAILED DESCRIPTION OF THE INVENTION

Figure 1:
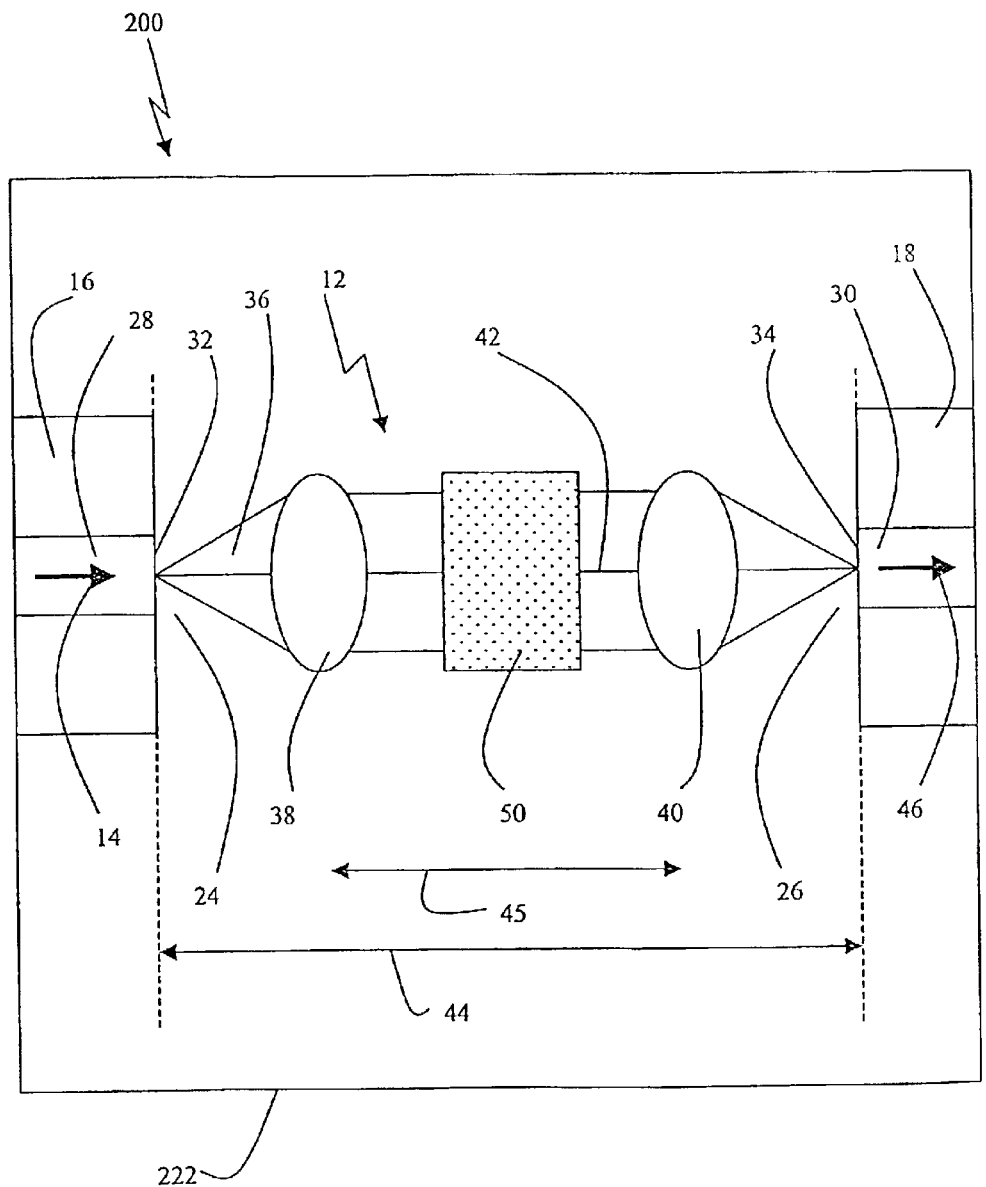
FIG. 1 is a schematic plan view, labeled PRIOR ART, of an optical channel having a first collimating lens and a second collimating lens.

A PRIOR ART apparatus 200 having at least one first optical channel 12 for transmitting an optical signal 14 between a source 16 at a first end 24 and a destination 18 at a second end 26 will be described with reference to FIG. 1. A first embodiment of an apparatus 10 having at least one first optical channel 12 having improved performance when compared with PRIOR ART apparatus 200 will be described with reference to FIGS. 2 through 5, 8 and 9. An optical switch 100 having improved performance for switching optical signal 14 between at least one source 16 and a selected one of a third plurality of alternative destinations 120 will be described with reference to FIGS. 6, 7, and 13 as one example of an application of the present invention. A portion 502 of an alternative embodiment of a optical switch 500 comprising a single first optical channel 12 and a plurality of third optical channels 120 will be described with reference to FIG. 10. A second embodiment of apparatus 600 having at least one optical channel 612 having alternative repeating patterns of lenses 52 will be described with reference to FIG. 11. A third embodiment of apparatus 700 having at least one optical channel 712 having a repeating pattern of lenses 52a, 52b having different sizes will be described with reference to FIG. 12. Elements that are common to PRIOR ART apparatus 200, first embodiment of apparatus 10, second embodiment of apparatus 600, third embodiment of apparatus 700, optical switch 100, and alternative embodiment of optical switch 500, and that have a similar function, will be identified by the same reference numeral.

Referring to FIG. 1, PRIOR ART apparatus 200 for enabling optical communication between source 16 at first end 24 and destination 18 at second end 26 typically comprises a body 222 providing at least one first optical channel 12. Non-limiting examples of source 16 include a first optical fiber 28, as illustrated in FIG. 1, a laser and a dense wave division multiplexer. Non-limiting examples of destination 18 include a second optical fiber 30, as illustrated in FIG. 1, a detector, an optical signal analyzer and a demultiplexer. Source 16 is in optical communication with first optical channel 12 at first end 24 and destination 18 is in optical communication with first optical channel 12 at second end 26. When source 16 is first optical fiber 28, and destination 18 is second optical fiber 30, first optical channel 12 extends between a first distal end 32 of first optical fiber 28 and a second distal end 34 of second optical fiber 30. As optical signal 14 is emitted as a light beam 36 from first distal end 32 of first optical fiber 28 it tends to diverge. In order to collimate light beam 36 and direct said light beam 36 toward destination 18, source 16 and first optical channel 12 are optically coupled using a first collimator shown herein as a first collimating lens 38. Similarly, destination 18 and first optical channel 12 are optically coupled using a second collimator shown herein as a second collimating lens 40. First collimating lens 38 and second collimating lens 40 commonly are positioned axially along a first optical axis 42 extending a length 44 of first optical channel 12 between first distal end 32 of first optical fiber 28 in a straight line to second distal end 34 of second optical fiber 30. Apparatus and methods for so collimating light beam 36 are described by, for example, Hamm in U.S. Pat. No. 6,263,133; Liu and Chang in U.S. Pat. No. 6,246,812; and Pan et al. in U.S. Pat. No. 6,198,858. Source 16 and destination 18 thereby are in optical communication via first optical channel 12, as illustrated by light beam 36.

When it is desired that optical signal 14 is amended or intercepted, an appropriate optical device 50 is situated, typically between first collimating lens 38 and second collimating lens 40, so as to intercept at least a portion of light beam 36. Examples of types of optical device 50 include a filter for selectively passing or reflecting selected wavelengths of light, an attenuator for attenuating light beam 36, a monitor for monitoring a quality, strength or content of optical signal 14, an optical tap for tapping a portion of optical signal 14, and an optical switch for redirecting light beam 36.

It will be recognized that first optical channel 12 can be operated in any of a forward manner, a reverse manner in which source 16 is at second end 26 and destination 18 is at first end 24, and a bi-directional manner, according to the need of the application.

Typically, when a PRIOR ART optical switch for optical communication systems includes a plurality of first optical channels 12, an array of optical devices 50 is situated intermediately between first collimating lenses 38 and second collimating lenses 40. Said optical devices 50 include, for example, pop-up mirrors. Said mirrors are individually engaged to either pass optical signal 14 from source 16 to destination 18 or to redirect said signal 14 to a selected one of alternative destinations (not illustrated in FIG. 1).

Figure 2:
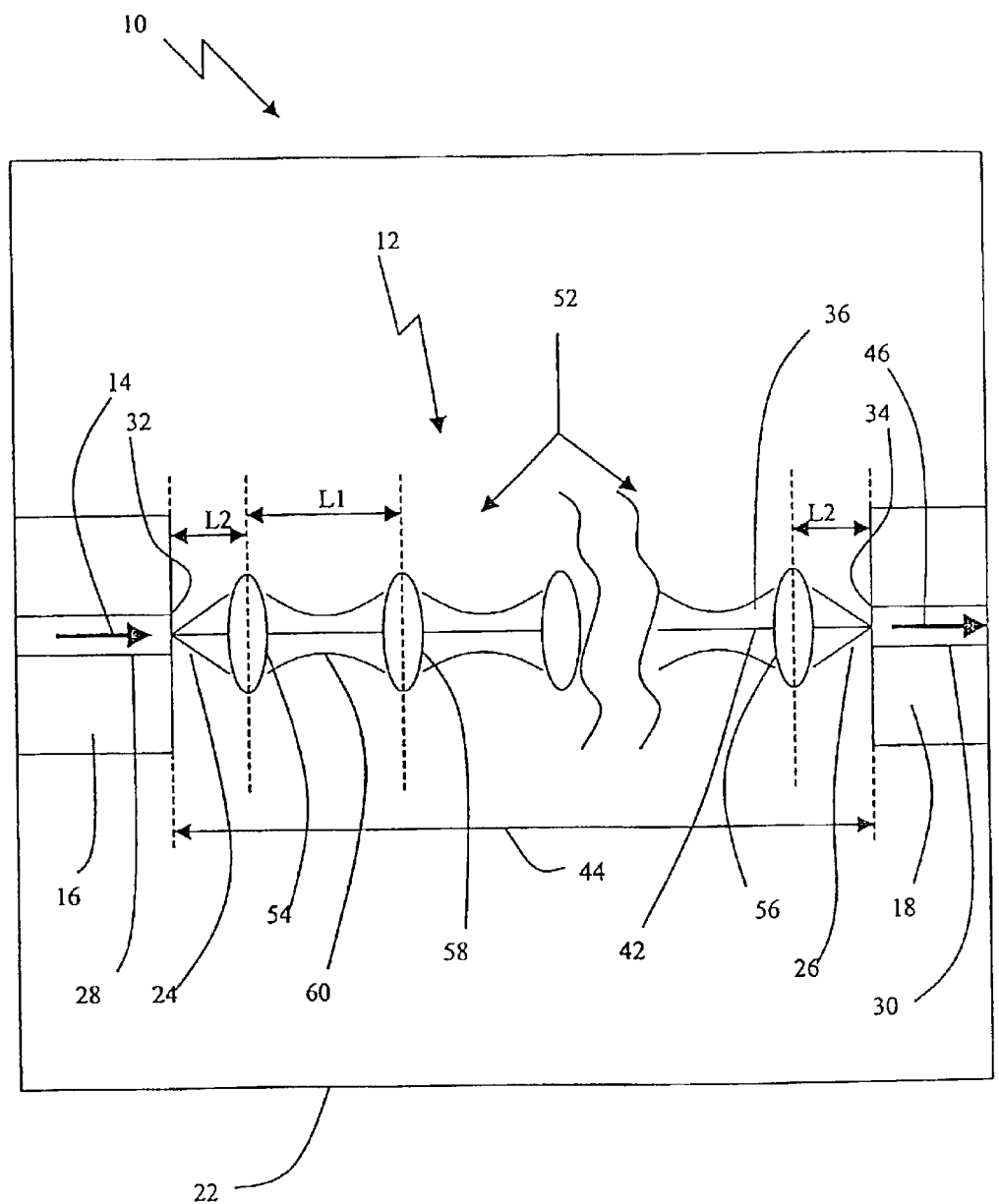
FIG. 2 is a schematic plan view of an optical channel having an N-fold first plurality of lenses situated at regular intervals along the optical axis.

Referring to FIG. 2, first embodiment of apparatus 10 has a body 22 providing at least one first optical channel 12 having first optical axis 42 extending as a straight line between first end 24 and second end 26. First distal end 32 of source 16, illustrated as first optical fiber 28, is situated at first end 24 of first optical channel 12. When first optical channel 12 is not a through channel, second end 26 is a blind end or an open end (not illustrated). When first optical channel 12 is a through channel, second distal end 34 of destination 18, illustrated as second optical fiber 30, is at second end 26.

An N-fold first plurality of lenses 52 are situated axially at regular intervals along first optical axis 42. Plurality of lenses 52 comprises a first lens 54 situated toward first end 24, a second lens 56 situated toward second end 26, and an (N−2)-fold plurality of third lenses 58 interspersed at regular intervals between first lens 54 and second lens 56. Lenses 52 can be selected from any light focusing elements including ball lenses, thin lenses, GRIN lenses, and composite lenses. In first embodiment of apparatus 10, all of lenses 52 in first optical channel 12 have substantially the same optical properties, and therefore have similar focal lengths. N is an integer number at least two. It has been found through calculations that, when lenses 52 are spheres that have close to true sphericity, losses arising from spherical aberration are negligible for values of N that are very large, even when N has a value of at least 33. In practice, ball lenses 52 are found to have small imperfections. Consequently, experiments were conducted using commercially available ball lenses having good sphericity. It was found that excellent performance was obtained when N is an integer number in the range between 2 and at least 9, as there was a minimized amount of insertion loss as light signal 36 was transmitted along first optical channel 12. It also was found experimentally that replacing a lens having an imperfection with a lens without said imperfection gave a measurable improvement in performance.

Any one lens 52 is spaced from an adjacent lens 52 by a first length L1 along first optical axis 42. It has also been found through experiments and calculations that first length L1 preferably is not greater than four times a focal length of each of lenses 52, so as to minimize loss of strength and to minimize loss of coherence of light beam 36 through dispersion between lenses 52. Light beam 36 cannot be as well confined as is illustrated in FIG. 2 when L1 is greater than four times the focal length. First lens 54 is positioned toward first end 24 and is spaced from first end 24, and hence from first distal end 32 of first optical fiber 28, by a second length L2 along first optical axis 42. Second length L2 is about one-half of first length L1. Second lens 56 is positioned toward second end 26 and is spaced from second end 26, and hence from second distal end of second optical fiber 30, also by second length L2. Optical signal 14 is emitted as light beam 36 and is continuously refocused by each of succession of lenses 52 to form a regular (N−1)-fold plurality of waists 60 between each adjacent pair lenses 52.

It has been found through experiments that the axial position of each of lenses 52 must be maintained very close to first optical axis 42 in order to obtain an optimum level of performance of first optical channel 12 for transmission of optical signal 14. For example, when each of lenses 52 is a ball lens having a diameter of 300 microns, and when first length L1 is about 884 microns and second length L2 is about 442 microns, the maximum deviation from regularity of each of first length L1 and second length L2 must be no greater than 10 microns, and preferably is less than 3 microns, and that the radial deviation from first optical axis 42 of each ball lens cannot be more than 1 micron, and preferably is less than 0.5 microns. For example, an 8×8 switch, for which a portion of the above experimental data has been obtained, has an array of lenses 52, nine of which are situated along any one of first optical axis 42, and therefore said 8×8 switch has optical paths that have up to 16 lenses 52.

Typically, ball lenses as supplied from a manufacturer have a distribution of sizes that approaches the criteria to meet these conditions. For example, one supplier, Deposition Sciences Inc., manufactures ball lenses having a nominal diameter D that is 300 microns, with a ball-to-ball maximum variance in diameter $\sigma D$ that is ±2.5 microns. When two of these ball lenses lie on a plane, the maximum variance between the heights of the centers of the ball lenses arising from the variance in the diameter of the lenses alone will be ±1.25 microns. Scussat et al. in the commercial web site "Optical Surface Mounted Devices (SMD)" describe one means to mount optical devices with high relative positioning accuracy (0.1 micrometers) and positional stability better than 0.2 micrometers.

Figure 3:
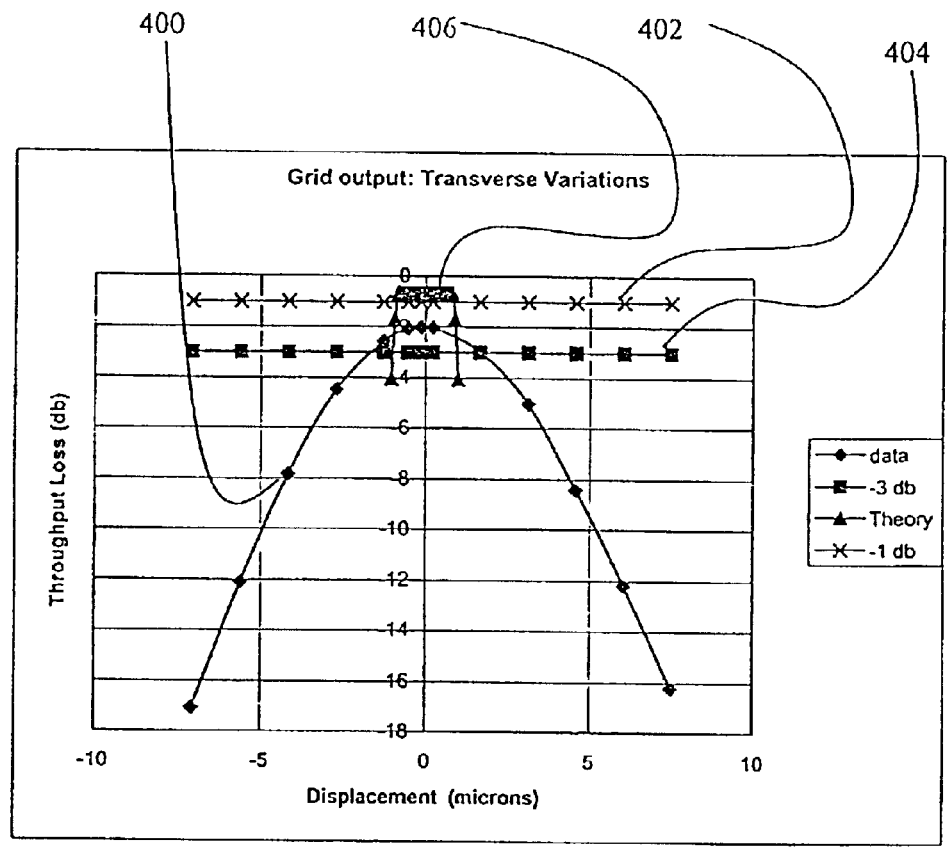
FIG. 3 is a plot showing performance of an optical channel having nine ball lenses regularly spaced along the optical axis (N is 9).

When first optical channel 12 is a through channel, and with the arrangement of lenses 52 as shown in FIG. 2, it has been found that light beam 36 is focused very well by second lens 56 toward second distal end 34 of destination 18. This arrangement of lenses 52 in optical channel 12 has been found to provide superior performance when compared with prior art apparatus 200 having similar dimensions, for transmitting fiber optic signals 14 from first optical fiber 28 to second optical fiber 30. A plot showing the performance of an array having several first optical channels 12, each of said first optical channels 12 having nine ball lenses 52 (N=9), is shown in FIG. 3.

It is a benefit of use of the present invention that light beam 36 is transmitted between source 16 and destination 18 via first optical channel 12 with high retention of signal without the requirement for use of additional complex equipment to collimate said light beam 36.

Wilson in "*Numerical Aperture Limits on Efficient Ball Lens Coupling of Laser Diodes to Single-Mode Fibers With Defocus To Balance Spherical Aberration*", NASA Technical Memorandum 4578, published by National Aeronautics and Space Administration in November 1994, summarizes results from several papers describing defocusing of a ball lens optical system to compensate for spherical aberration on transmission of light through a ball lens. In the present invention, when each of lenses 52 is a ball lens, it has been found that second length L2 preferably is about 5% less than one-half of first length L1. With this arrangement of lenses 52, an improvement in the quality of output light signal 46 has been found to occur as a consequence of reducing the deleterious effect of spherical aberration arising from the shape of the ball lenses.

It will be recognized by one skilled in the art that source 16 and destination 18 can be reversed so that first optical channel 12 can be operated uni-directionally in either direction, and that first optical channel 12 can be operated bi-directionally.

Figure 4:
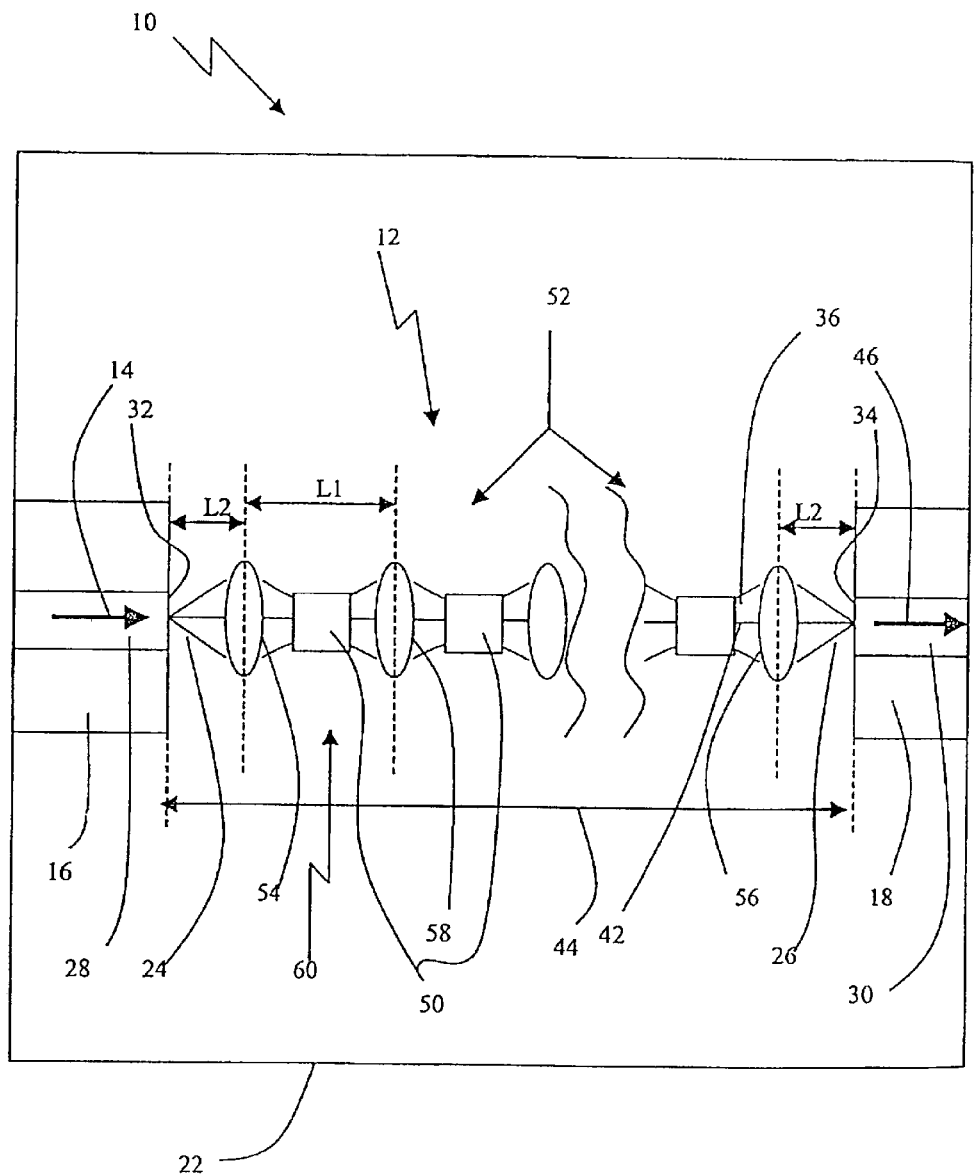
FIG. 4 is a schematic plan view of an optical channel in first embodiment of the apparatus, having an N-fold first plurality of lenses situated at regular intervals along the optical axis and a (N−1)-fold second plurality of optical devices interspersed between said lenses.
Figure 10:
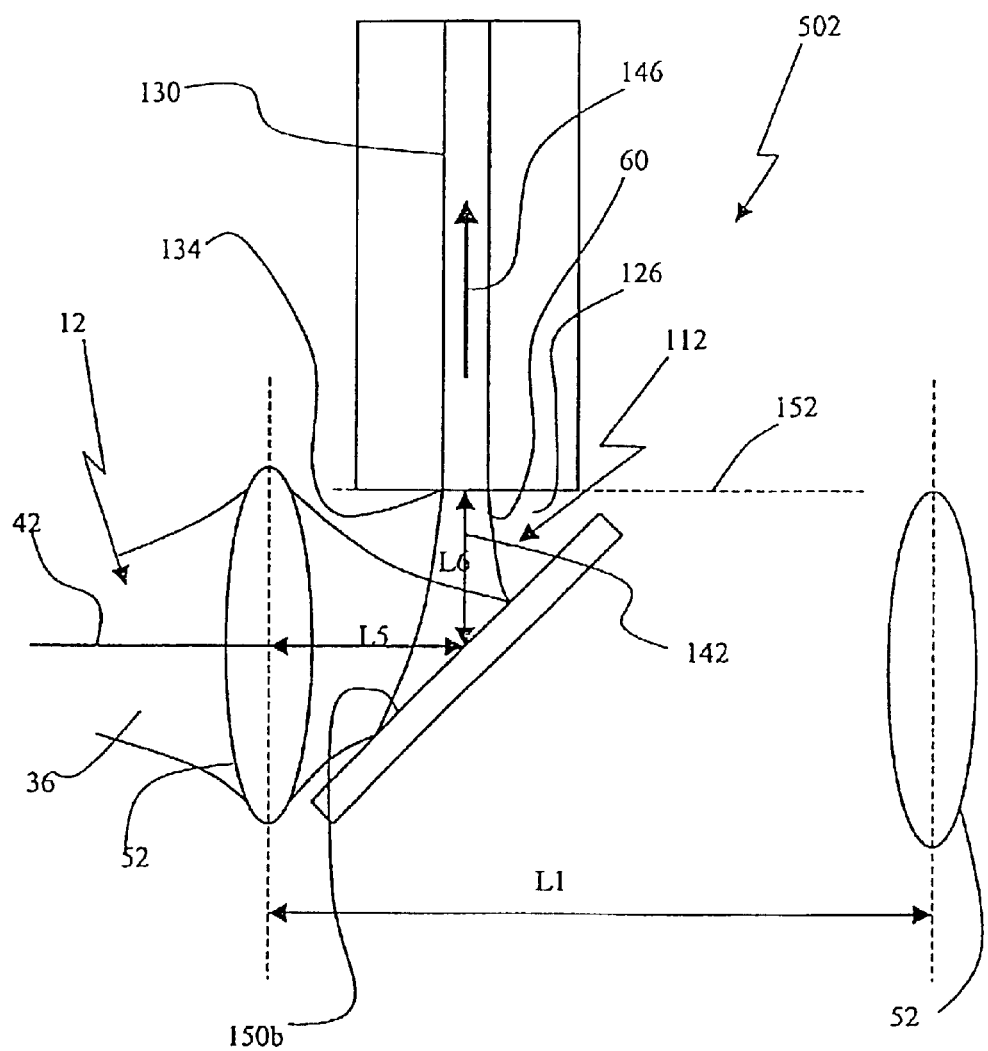
FIG. 10 is a schematic view of a portion of 1×(N−1) array of switches in which a reflector is situated in an off-waist position.

Referring to FIG. 4, light beam 36 can be processed or intercepted by situating, individually, at least one optical device 50 between each of one or more pairs of lenses 52, either close to waists 60 as illustrated in FIG. 4 or in an off-waist position as illustrated in FIG. 10. Optical devices 50 may include one or more of:

a filter for selectively passing or reflecting one or more selected ranges of wavelengths of light;

an attenuator for attenuating light beam 36;

a monitor for monitoring a quality, strength or content of optical signal 14;

an optical tap for tapping a portion of optical signal 14; and a reflector for redirecting optical signal 14.

Figure 5:
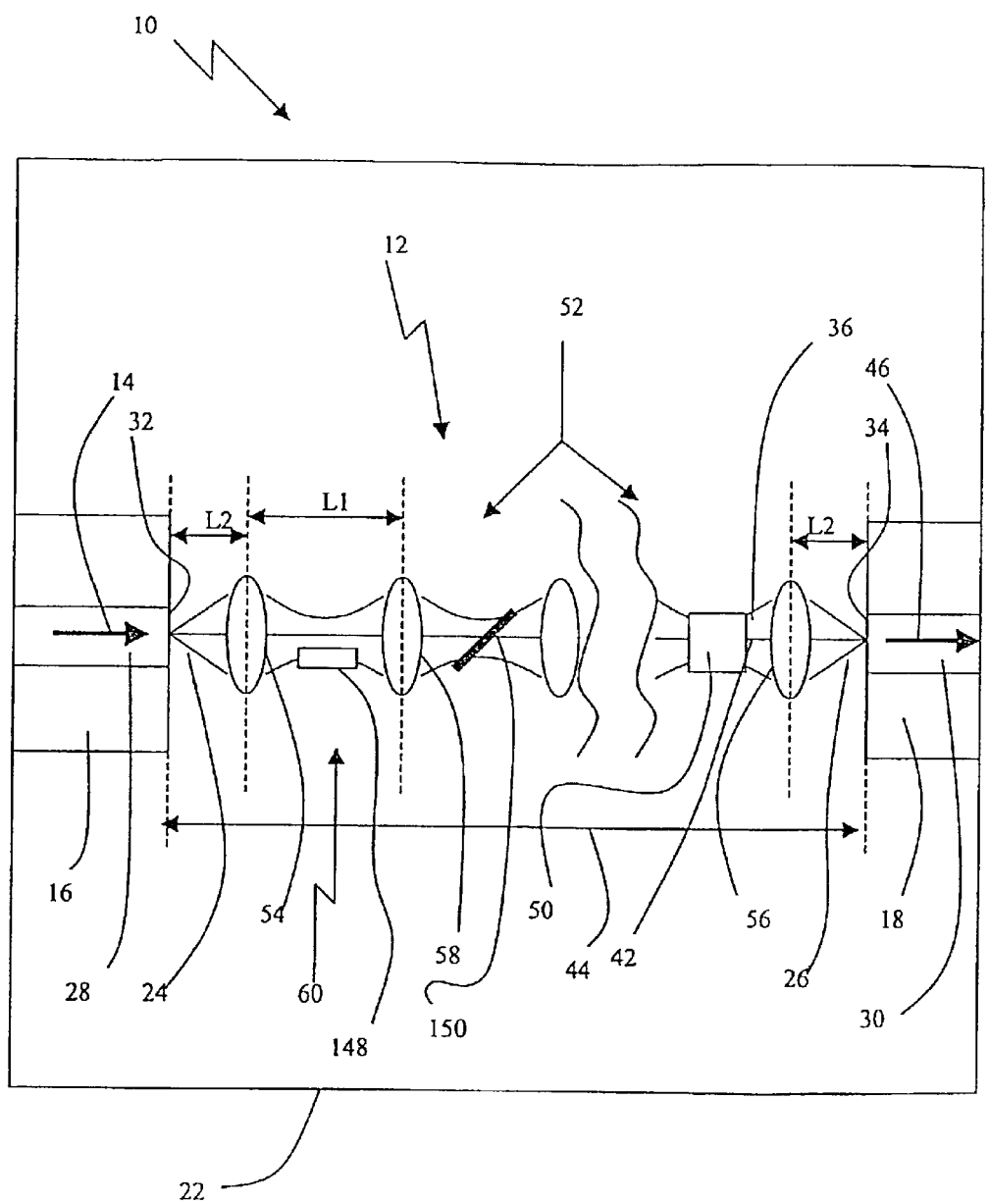
FIG. 5 is a schematic plan view of the optical channel illustrated in FIG. 4, wherein the (N−1)-fold second plurality of optical devices includes one optical tap and a (N−2)-fold plurality of reflectors for redirecting optical signals.

Referring to FIG. 5, it will be recognized that combinations of these optical devices 50 can be situated in the same first optical channel 12. For example, a monitor 148, to monitor a quality of optical signal 14 and/or a level of performance of first optical channel 12, may be used in combination with one or more movable reflectors 150 to intercept and redirect light beam 36.

Figure 6:
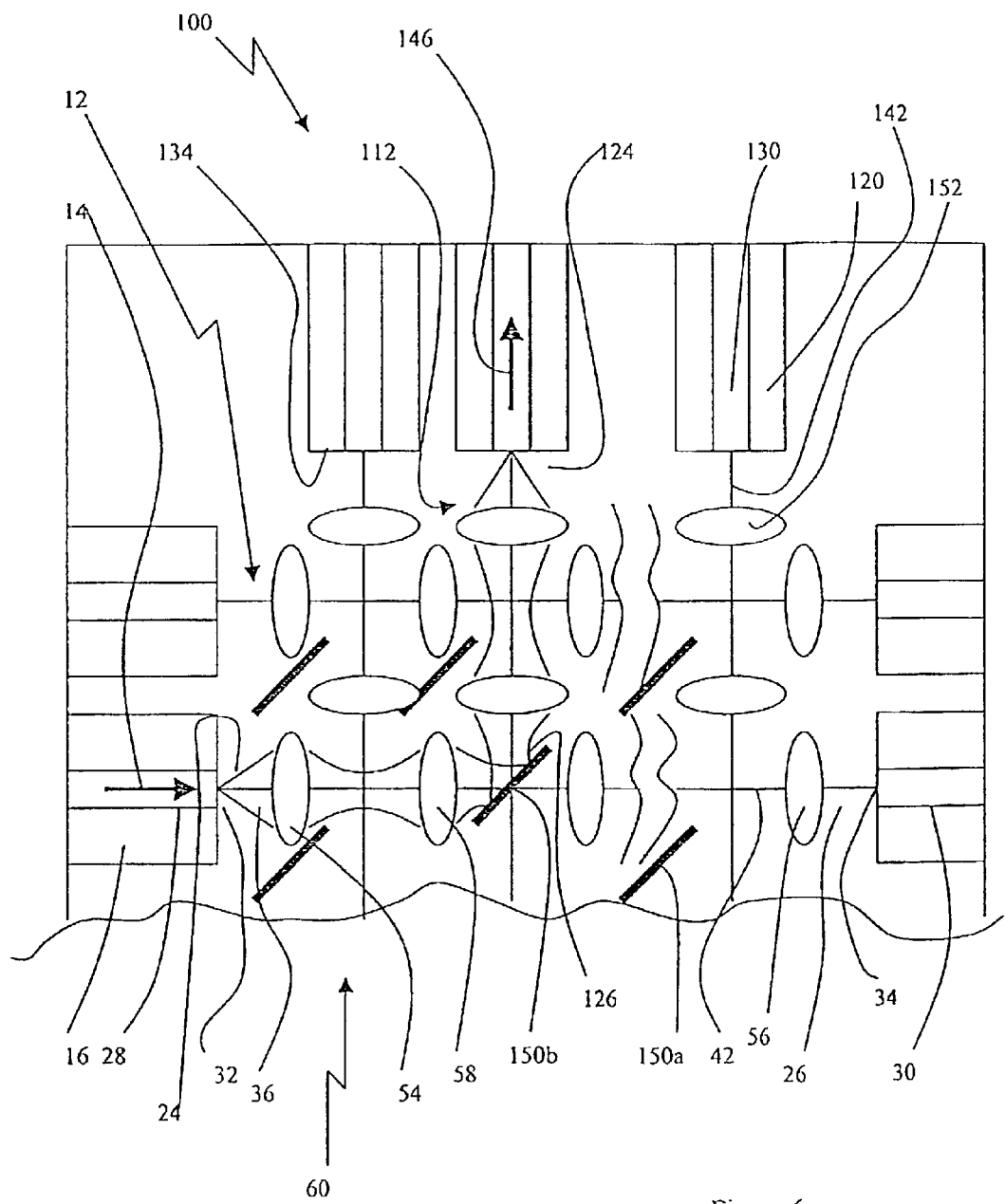
FIG. 6 is a schematic plan view of an optical switch comprising at least one first optical channel having a N-fold first plurality of lenses and a (N−1)-fold second plurality of movable reflectors regularly interspersed, and a (N−1)-fold third plurality of second optical channels.
Figure 7:
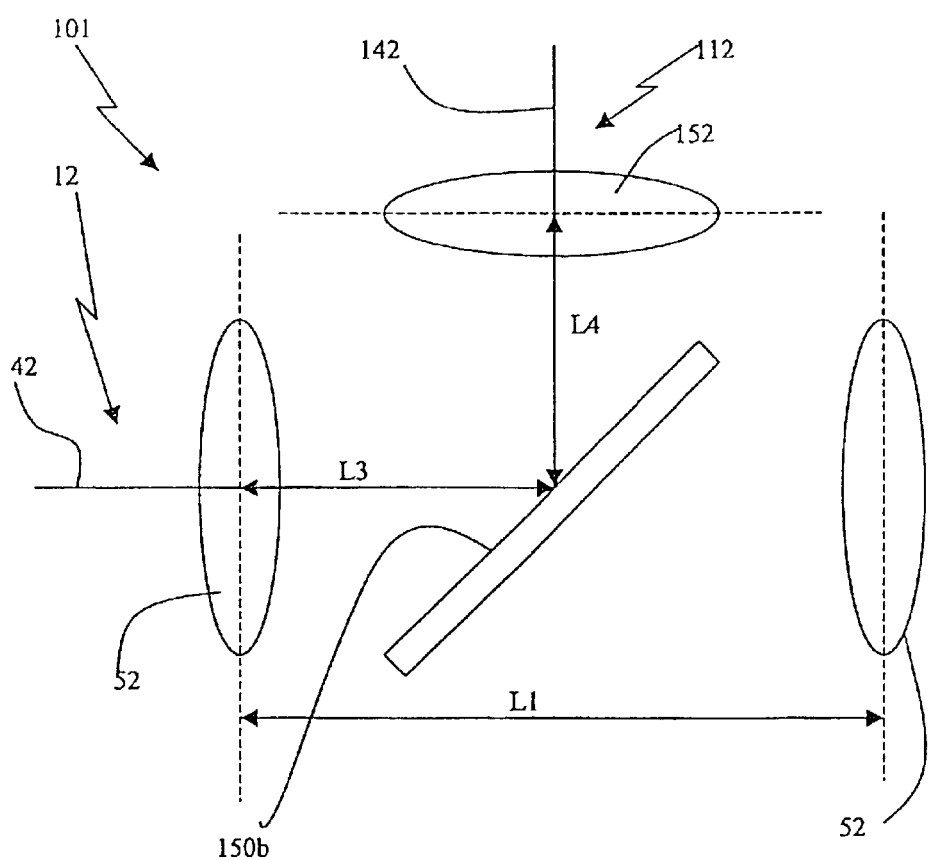
FIG. 7 is a schematic plan view of a portion having one reflector of a M×(N−1) array of switches for switching optical signals between a M-fold fourth plurality of input channels and a (N−1)-fold third plurality of output channels.
Figure 13:
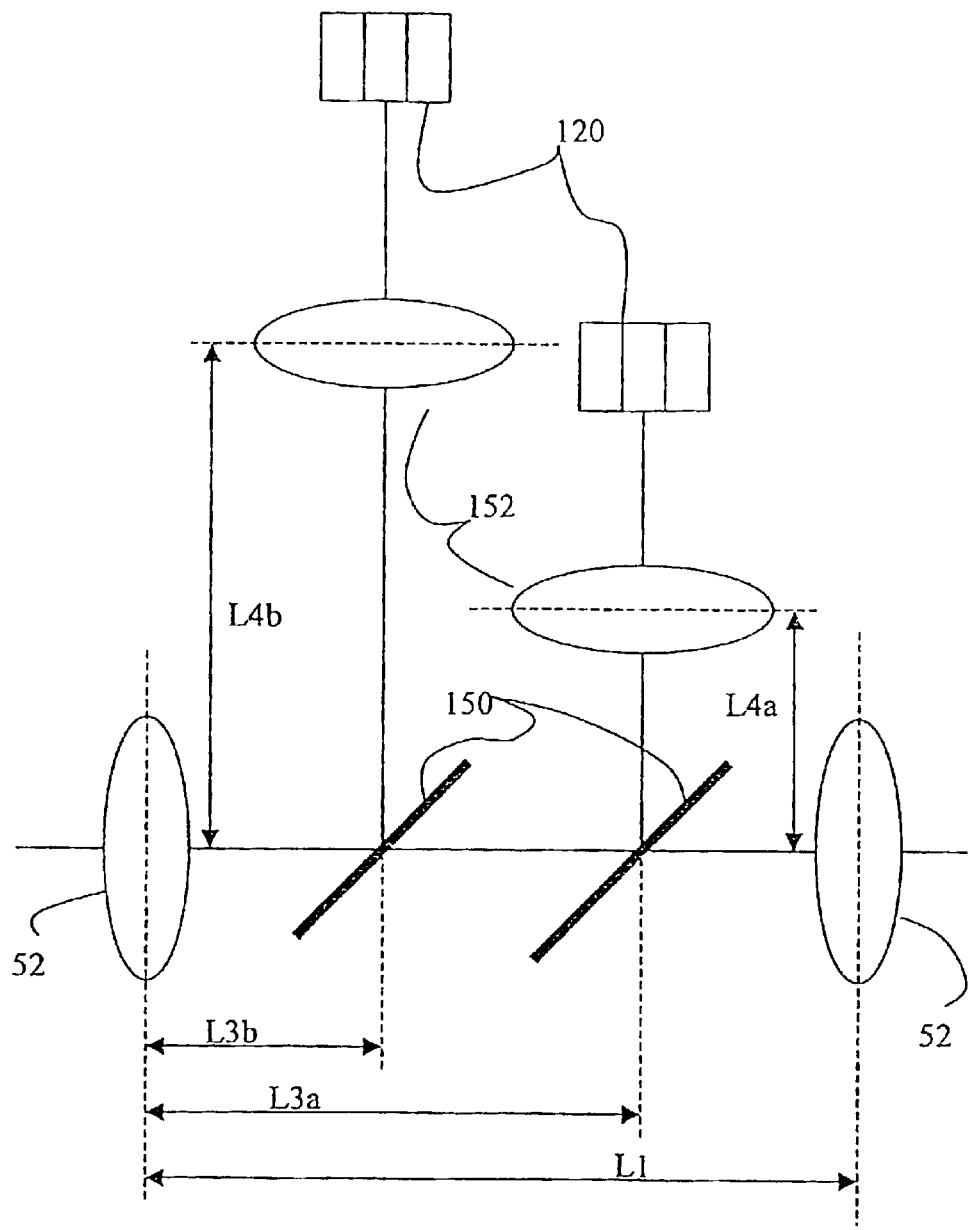
FIG. 13 is a schematic view of an optical channel in which there are two reflectors situated between a neighbouring pair of lenses.

Referring to FIGS. 6, 7, and 13, examples of one application of the present invention are shown as optical switch 100. Referring to FIG. 6, optical switch 100 has a body 122 having at least one first optical channel 12, as described above and shown in FIG. 4, having first plurality of lenses 52. Optical switch 100 has second plurality of movable reflectors 150a, 150b in place of devices 50 shown in FIG. 4, and third plurality of second optical channels 112. Each of second optical channels 112 extends between a third end 124 and a fourth end 126. Reflectors 150a, 150b are movable between an "on" position, illustrated by a position of reflector 150b, and an "off" position, illustrated by a position of reflector 150a. Each of movable reflectors 150a, 150b is independently situated between adjacent pairs of lenses 52 at third end 124 of one of second optical channels 112. When each second optical channel 112 has a reflector 150a, 150b at third end 124, the second plurality is the same as the third plurality. A light receiving device such as an alternative destination 120, for example a third distal end 134 of a third optical fiber 130, is situated at fourth end 126 of each of second optical channels 112. When optical switch 100 has more than one first optical channel 12, at least one fourth lens 152 is situated axially along a second optical axis 142 that extends from third end 124 along second optical channel 112 to fourth end 126.

In order for light beam 36 to be focused at alternative destination 120, such as third distal end 134 of third optical fiber 130, the same conditions must apply as for transmission of light beam 36 through a through channel 12, as shown in FIG. 2. Referring to FIG. 7, showing a portion 101 of optical switch 100 having reflector 150b, a separation between lens 52 situated axially along first optical axis 42 and immediately before reflector 150b in the on position and said reflector 150b has a third length L3. A separation between reflector 150b and immediately following fourth lens 152 situated axially along second optical axis 142 has a fourth length L4. When lens 52 and fourth lens 152 have substantially similar optical properties, in order that the above conditions apply for optimum transmission of light beam 36 redirected by reflector 150b and transmitted to alternative destination 120 as a redirected signal 146, a combination of third length L3 and fourth length L4 is similar in magnitude to first length L1.

Referring to FIG. 13, more than one optical device 50 can be situated between any one neighbouring pair of lenses 52. When the more than one optical devices 50 are reflectors 150, third length L3 and fourth length L4 will both have different values for each reflector 150. Nevertheless, the combination of L3 and L4 for any one reflector will be similar in magnitude to first length L1. Thus, in FIG. 13, the magnitudes of the sum of the lengths L3a and L4a, the sum of the lengths L3b and L4b, and the length L1 are approximately the same length.

Alternative embodiment of optical switch 500 comprises single first optical channel 12, as described above and shown in FIG. 4, having first plurality of lenses 52, a second plurality of movable reflectors 150a, 150b, and third plurality of second optical channels 112. The second plurality may be the same as the third plurality. A portion 502 of optical switch 500 is illustrated in FIG. 10. In alternative embodiment of optical switch 500 each of movable reflectors 150a, 150b is situated so that, when any one of said reflectors 150 is in the "on" position, illustrated by a position of reflector 150b, said reflector 150b is in an off-waist position. In this case, reflector 150b in the "on" position is distanced from center of lens 52 by a fifth length L5 along first optical axis 42. Alternative destination 120 is at fourth end 126 of second optical channel 112, as will now be illustrated using the case in which alternative destination 120 is distal end 134 of third optical fiber 130. Distal end 134, and hence fourth end 126, is distanced from reflector 150b by a sixth length L6 along second optical axis 142 of second optical channel 112. Alternative embodiment of optical switch 500, illustrated in FIG. 10, has no fourth lens 152 along second optical axis 142 in contrast to optical switch 100, illustrated in FIGS. 6 and 7. Referring again to FIG. 10, the sum of fifth length L5 and sixth length L6 is approximately equal to one-half of first length L1. A consequence of this equality is that one of waists 60 of light beam 36 is formed at third distal end 134 of third optical fiber 130 of alternative embodiment of optical switch 500. Consequently, a high proportion of the intensity of light beam 36 that is redirected by reflector 150b is focused at distal end 134, and is thereby transmitted to distal end 134, thence along third optical fiber 130 as redirected signal 146, with a high retention of signal strength and signal quality.

It will be recognized by one skilled in the art that source 16 and alternative destination 120 can be reversed so that a combination of first optical channel 12 and second optical channel 112 can be operated in the reverse direction, and that the combination of first optical channel 12 and second optical channel 112 can be operated bi-directionally.

It also will be recognized that, when the magnitude of length L1 is sufficiently large, more than one optical device 50 such as reflectors 150 can be situated between any one neighbouring pair of lenses 52.

When it is desirable to situate more than one optical device 50 between any neighbouring pair of lenses 52, it may be necessary to increase separation between neighbouring lenses 52 along first optical channel 12. Said increase in separation can be achieved while retaining performance of first optical channel 12 in more than one different ways, two of which are illustrated by way of examples in FIGS. 11 and 12.

Figure 11:
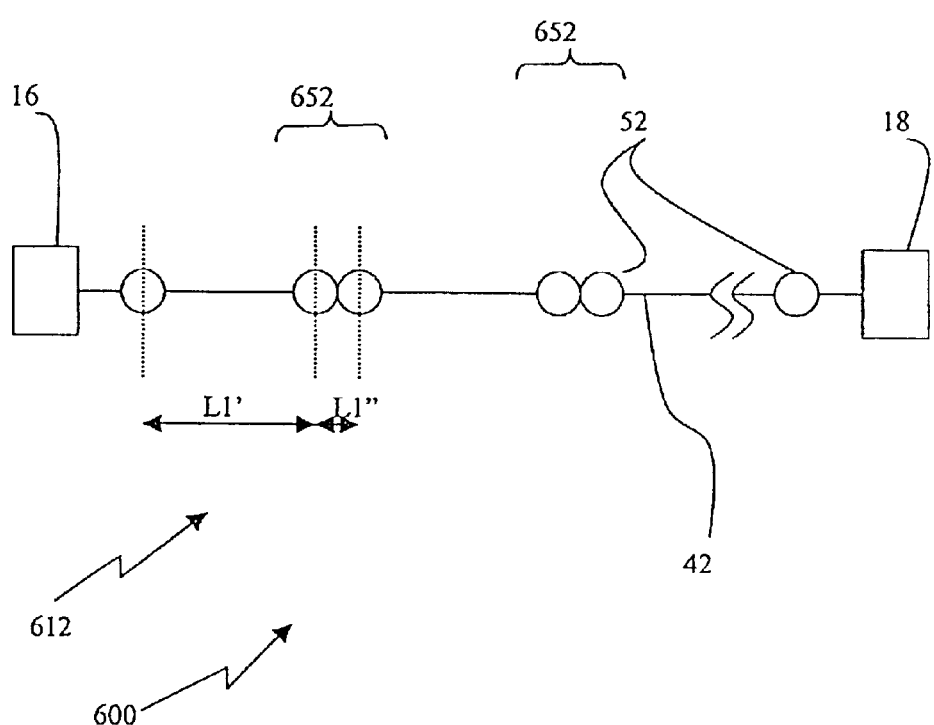
FIG. 11 is a schematic view of an optical channel in second embodiment of the apparatus, having a first alternative pattern of lenses having substantially similar sizes.

Referring to FIG. 11, second embodiment of apparatus 600 has an alternative first optical channel 612 having an alternative arrangement of lenses 52. When two lenses 52 are in close proximity, said lenses 52 act as a compound lens system 652. Compound lens 652 has a focal length that is longer than a focal length of one of said lenses 52 alone. Thus, an alternating sequence of longer spacings L1' and shorter spacings L1" between lenses 52 allows a separation L1' that is longer than L1, illustrated in FIGS. 4 and 5. Consequently, it is easier to accommodate more than one optical device 50 situated along length L1' between a neighbouring pair of composite lenses 652, than between a neighbouring pair of lenses 52, as shown in FIGS. 4 and 5.

Figure 12:
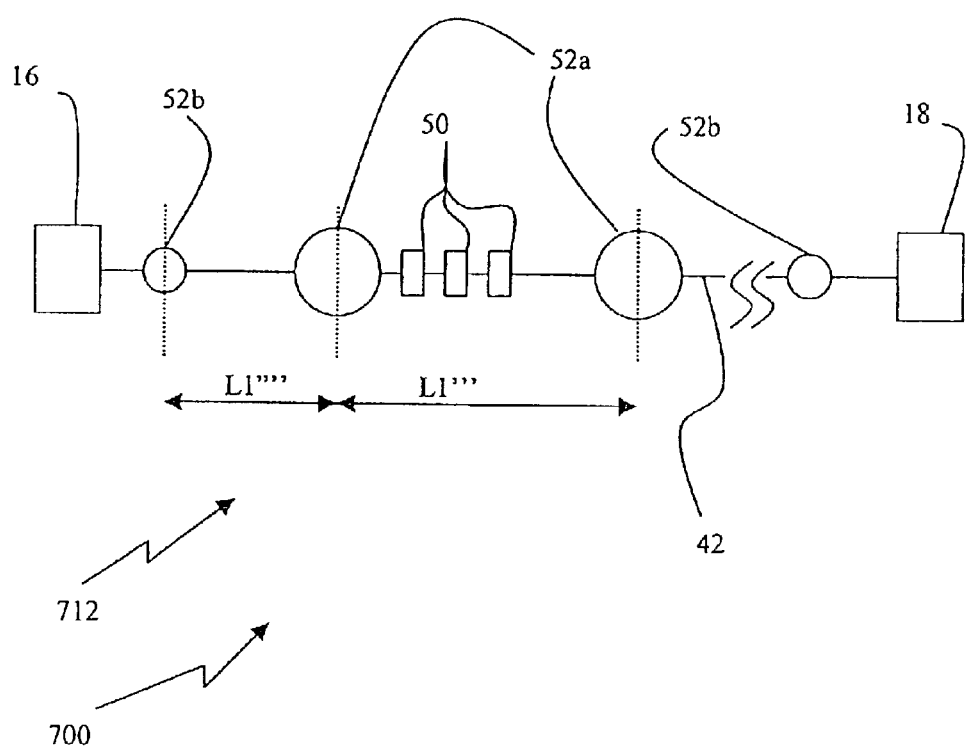
FIG. 12 is a schematic view of an optical channel in third embodiment of the apparatus, having a second pattern of lenses in which the lenses are of two different sizes.

Third embodiment of apparatus 700 has another alternative first optical channel 712 having an arrangement of lenses 52 comprising at least two sets of lenses 52 having different optical properties, as illustrated in FIG. 12. Using ball lenses 52 for purposes of illustration, a larger ball lens 52a has a larger focal length than a smaller ball lens 52b. A series of larger ball lenses 52a and smaller ball lenses 52b can be used to provide first optical channel 712 having different spacings: L1'" between a neighbouring pair of larger ball lenses 52a, and L1"" between neighbours that are one of smaller ball lenses 52a and one of larger ball lenses 52b. Comparing FIG. 12 with FIGS. 4 and 5, larger ball lens 52a has a longer focal length than ball lens 52. Thus spacing L1'" can be longer than spacing L1. Consequently, it is easier to accommodate situation of more than one optical device 50 between a neighbouring pair of larger ball lenses 52a than between a neighbouring pair of lenses 52.

It will be recognized by one skilled in the art that other sequences and/or combinations of lenses and spacings between neighbouring lenses will also confer advantages, including a combination of compound lenses 652 as illustrated in FIG. 11 having different optical properties as illustrated in FIG. 12, without departing from the spirit or substance of the present invention.

EXAMPLES

PRIOR ART systems comprise optical channels normally having a small number (N) of lenses, typically no more than two lenses per channel (N is 2). Further, when a first optical channel 12 includes a pair of collimating lenses 38, 40, as illustrated in FIG. 1, said collimating lenses 38, 40 may be separated by a distance 45 that is greater than four times the focal length of either of said collimating lenses 38, 40. In each case, optical losses are a concern.

It will now be shown that the present invention has performance advantages not available through use of the PRIOR ART. Performance of apparatus 10 will be illustrated using non-limiting examples in which N has different values ranging between 0 and 9. It also has been shown by calculation and experiment that high performance can also be achieved when N has a value greater than 9, including examples where N has a high value such as 33.

Example 1

Figure 8:
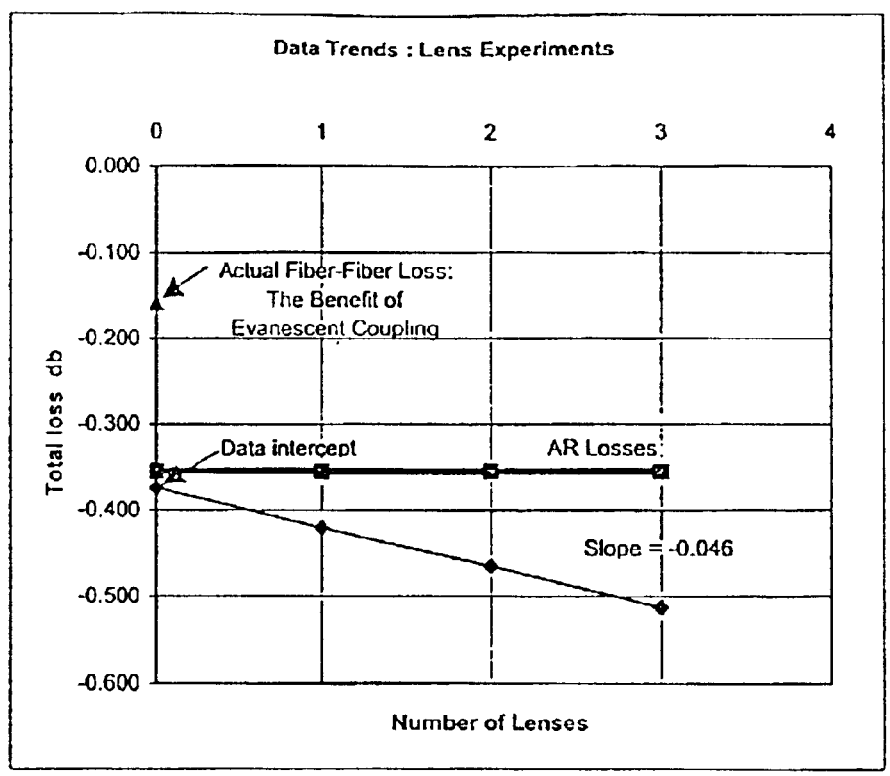
FIG. 8 is a plot showing the loss in intensity found experimentally for an optical beam as it is transmitted through a series of lenses as a function of the number of lenses.

A series of experiments was conducted to determine the loss in power as a function of the number (N) of lenses 52 in first optical channel 12. An optical signal was transmitted through different series of ball lenses 52 that were axially aligned along first optical channel 12 and that were spaced from each other in a regular manner along first optical axis 42 according to the specifications of the invention. The loss in intensity of light signal 14 when it was transmitted through lenses 52 was measured, and the results, expressed in db units, were plotted as illustrated in FIG. 8.

In a first experiment there were no lenses 52 in first optical channel 12 (N=0). In this experiment, the positions of emitting first distal end 32 of first optical fiber 28 and receiving second distal end 34 of second optical fiber 30 were adjusted until they were mutually opposed, situated in close proximity, and optimally aligned, so as to maximize the amount of light signal 14 received by second optical fiber 30 when said light signal 14 was transmitted from first optical fiber 28. A horizontal line in FIG. 8, labeled "AR Losses", shows the amount of an unavoidable loss of intensity of light signal 14 that occurs as a result of transmission of said light signal 14 through the surfaces of ends of AR coated fibers used for the experiment. The amount of these AR Losses is constant for all experiments. It can be seen that there is very little additional loss of intensity of the signal on transmission from first optical fiber 28 to second optical fiber 30 when they are opposed, in close proximity, and optimally aligned.

A second experiment was conducted to determine the minimum loss in intensity of light signal 14 when it is transmitted through a single lens 52 (N=1). The positions of first distal end 34 of first optical fiber 28 and second distal end 34 of second optical fiber 30 were both adjusted so that first optical axis 42 lay through the center of lens 52. The difference in the loss found in this experiment and the loss found when N is zero is the loss of intensity on transmission through single lens 52. The value shown in FIG. 8 is the minimum value of the loss when N is one.

A third experiment was conducted using first optical channel 12 having two lenses 52 (N=2). In this case, a straight line extending through the centers of the two lenses 52 defines first optical axis 42 of apparatus 10 when N is two. The positions of first distal end 32 of first optical fiber 28 and second distal end 34 of second optical fiber 30 were both adjusted so that emitting first distal end 32 of first optical fiber 28 and receiving second distal end 34 of second optical fiber 30 both were aligned with first optical axis 42. The measured value in db units of the loss of intensity on transmission of signal 14 through two lenses 52 was found to be double the measured value in db units on transmission through one lens 52. When either or both of first distal end 32 of first optical fiber 28 and second distal end 34 of second optical fiber 30 was displaced from alignment with optical axis 42, the loss of intensity of light signal 14 transmitted along first optical channel 12 increased.

A fourth experiment was conducted using first optical channel 12 having three lenses 52 (N=3). In this case, the three lenses 52 were aligned along a common first optical axis 42, and first distal end 32 of first optical fiber 28 and second distal end 34 of second optical fiber 30 were both aligned with first optical axis 42. When either or both of first distal end 32 of first optical fiber 28 and second distal end 34 of second optical fiber 30 was displaced from alignment with optical axis 42, the loss of intensity of light signal 14 transmitted along first optical channel 12 increased.

In FIG. 8, it can be seen that the data points for the conditions (N=0), (N=1), (N=2), and (N=3) fall along a straight line with a slope having a value of −0.046 db per lens. The linearity of the plot shows that the loss through any one lens 52 is substantially the same as the loss through any other lens 52 when all three lenses 52 are aligned along a common optical axis and are spaced at regular intervals according to the present invention.

Further, by comparing the results from this series of experiments with manufacturers' published data, and with PRIOR ART systems having a pair of collimating lenses, it is shown that precisely aligning a series of lenses 52 and spacing said lenses 52 in a regular pattern along a common first optical axis 42 according to the present invention affords the advantage of greatly reduced losses in intensity of optical signal 14 transmitted through the series of lenses 52.

As a corollary, this series of experiments showed that a plurality of lenses 52 can be aligned with a sufficient degree of precision relative to an optical axis 42, and can be spaced at appropriate regular intervals L1, L2, along said optical axis 42, so as to reduce losses of intensity of a light signal 14 transmitted along first optical channel 12 according to the invention when compared with first optical channel 12 according to the PRIOR ART.

Example 2

Figure 9:
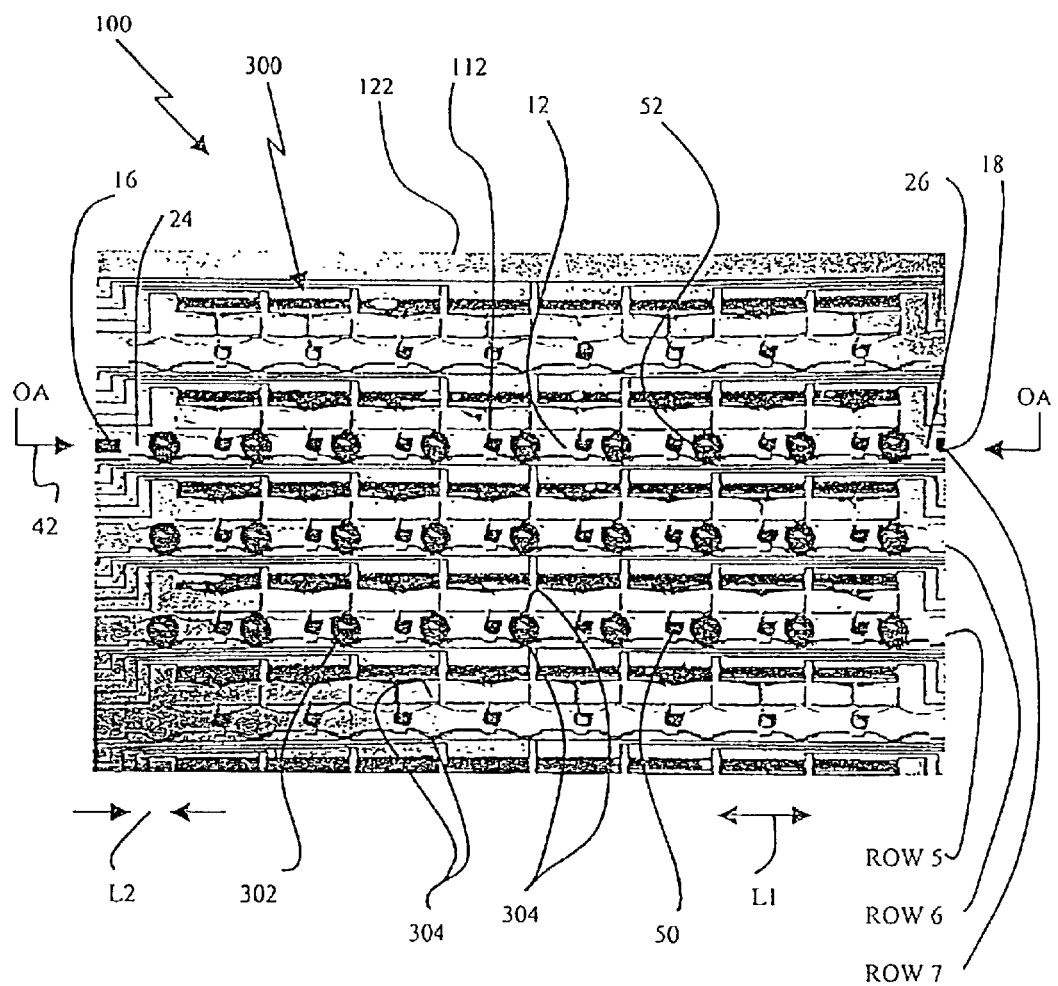
FIG. 9 is a photograph of an apparatus according to the invention comprising a series of parallel optical channels, three of which channels each contain nine ball lenses aligned and spaced at regular intervals along the optical axis.

Referring to FIG. 9, a second series of experiments has been conducted using experimental optical switch 100 comprising a populated grid array 300 having several first optical channels 12. Nine lenses 52, which in this series of experiments are ball lenses, are arrayed along first optical axes 42 of first optical channels 12. Second plurality of optical devices 50 are interspersed between ball lenses 52. Each of second optical channels 112 is at an angle close to 90 degrees to each of first optical channels 12.

Each one of ball lenses 52 is precisely located within array 300 by a positioning device 302. Several types of positioning device are known. Types of passive positioning devices include combinations of barriers such as walls or posts. A further type of passive positioning device is a micropit etched into a platform, as described in, for example, Lee et al. "2×2 *MEMS Fiber Optic Switches With Silicon Submount for Low-cost Packaging*", a conference paper available at web site http://cjmems.seas.ucla.edu/papers/LongSun-HH98.PDF, and by Huang et al. "*MEMS Packaging for Micro Mirror Switches*", a conference paper available at web site http://cjmems.seas.ucla.edu/papers/LongSun-pack98.PDF. Types of active positioning devices include movable springs, movable mountings coupled to comb drives, and calipers. In the present non-limiting example, each of positioning devices 302 comprises opposed pairs of reflexive springs 304. As one of ball lenses 52 is inserted between one pair of reflexive springs 304, each of said pair of reflexive springs 304 moves a sufficient amount to allow ball lens 52 to be positioned therebetween. When reflexive springs 304 are displaced from their resting positions to accommodate ball lens 52, they apply a holding pressure on ball lens 52, thereby constraining said ball lens 52 to remain at its position within array 300. Ball lens 52 is thereby accurately positioned along first optical axis 42 of first optical channel 12, shown as OA—OA in FIG. 9. One positioning device 302 is distanced from a neighboring positioning device 302 by distance L1.

Assembly of array 300 was undertaken in a hands-off approach: no adjustment of ball lenses 52 was made after their initial installation, so as to emulate an apparatus made in a manufacturing facility. Array 300 was then installed in a newly constructed fiber device alignment stage (not illustrated). Array 300, first optical fibers 28 and second optical fibers 30 of the fiber device were positioned to lie in the same plane, thereby bringing first optical fibers 28 and second optical fibers 30 parallel to first optical channels 12. Pre-alignment with a visible laser was used to bring the system into approximate alignment, then the light source was switched to a 1310 nm Thor Labs laser source (not illustrated). The position of the fiber-package alignment stages was adjusted until the optical throughput was increased to its maximum level. Measurements were then made using the aligned system to establish the throughput losses.

A second set of experiments in the second series was conducted to model the losses due to the multitude of connectors and fibers in the first set of experiments. A set of cables and connectors was substituted for array 300. Power measurements were again taken to establish a reference level. This procedure was repeated on each of the optical channels 12 having ball lenses 52, and results are compiled in Table 1. Each row of data represents a separate alignment of first optical fibers 28 and second optical fibers 30 with lenses 52. The data shows some variability, which may be due in part to variability in the fiber alignments from run to run, but is most likely due in large part to successive making and breaking of connections between the laser source and power meter fiber couplings.

A further set of experiments in the second series was run to evaluate transverse misalignment losses in the system to compare it to the theoretical sensitivity. The data shown as line 400 in FIG. 3 show the superiority of the aligned system of array 300 over PRIOR ART systems. Data at the constant −1 db level are illustrated by line 402 and at the constant −3 db level by line 404. However, each of ball lenses 52 is situated at the position at which it was inserted into positioning devices 302, without being individually repositioned so that it is aligned with great precision with first optical axis 42. Experimental data 300 show a significant broadening over the theoretical values, shown as line 406, and when compared with a precisely aligned system, as described in Example 1. The results from this series of experiments show that positioning of optical lenses 52 relative to optical path 12 in array 300 had less than optimal precision due to variations in the lateral positions of the various lenses 52 in array 300. Nevertheless, even though performance of each first optical channel 12 in array 300 is not an optimum performance, the superiority of performance of array 300 (line 400) over PRIOR ART systems is illustrated by the improvement over data illustrated by line 402 and line 404.

TABLE 1

| Grid Row | Reference mw | Thru Grid mw | Loss db | Corrected throughput loss Minus AR loss (.4 db) db |
|---|---|---|---|---|
| Row 5: | 0.939 | 0.497 | −2.8 | −2.4 |
| Row 6: | 0.939 | 0.555 | −2.3 | −1.9 |
|  | 0.994 | 0.513 | −2.9 | −2.5 |
| Row 7 | 1.040 | 0.517 | −3.0 | −2.6 |
|  | 0.920 | 0.475 | −2.9 | −2.5 |

Example 3

The theoretical optimum performance of optical switching system 200 comprising N×M arrays 300 of ball lenses 52, as described in Examples 1 and 2 above, has been calculated. Further, the effect on performance of array 300 arising from axial and/or radial deviations from optimum positioning of lenses has been calculated. Experiments have been conducted in which results have been obtained approaching the theoretical optimum performance.

The use of an axially aligned series of ball lenses 52 in the present invention can give rise to substantial spherical aberrations and potential coupling losses for transmission of a signal between optical fibers. However, we have found that, to a large degree, compensation for these effects can be made through defocusing the source and receiving fibers. We have shown through simulations that signal losses lower than 1.1 dB are attainable for the longest switched path of an 8×8 switch, comprising transmission through 16 ball lenses, and less than 0.75 dB for transmission through a line of 9 ball lenses. Experimental results have been obtained that approach these theoretical optimum results, but they have not been matched. For example, losses of the order of 1.5 dB were obtained for transmission along a path through 9 ball lenses.

What is claimed is:

1. An apparatus for transmitting an optical signal between a source and a destination, the apparatus having:
   a body providing:
      at least one first optical channel which is adapted for positioning in a space between a first end and a second end, such that in order for an optical signal beam to pass between the first end and the second end the optical signal beam must pass through the first optical channel;
      the first optical channel having a first optical axis extending in a straight line between the first end and the second end;
      the first end being in optical communication with one of the source and the destination;
      the second end being in optical communication with the other of the source and the destination;
      the optical channel having an N fold first plurality of lenses comprising a first lens, a second lens and an N−2 fold plurality of third lenses,
      the first lens being situated toward the first end of the first optical channel and spaced from the first distal end of the one of the source and the destination, the second lens being situated toward the second end of the first optical channel and spaced from the second distal end of the other of the source and the destination, and the third lenses being situated between the first lens and the second lens;
      the lenses being axially situated at intervals along the first optical axis, so that the optical signal beam emitted from the first distal end of the source is repeatedly refocused along the first optical axis toward the destination, and is focused at the second distal end of the destination;
   thereby providing for optical communication between the source and the destination along the first optical channel.

2. The apparatus as defined in claim 1, wherein the first optical channel can be operated in one of:
   a unidirectional manner, in which the source must be at the first end and the destination must be at the second end of the first optical channel;
   a reversible unidirectional manner, in which the source is at one of the first end and the second end and the destination is at the other of the first end and the second end of the first optical channel; and
   a bi-directional manner in which there is a device that serves as a source and a destination at both of the first end and the second end of the first optical channel.

3. The apparatus as defined in claim 1, wherein the number of lenses, N, is an integer number at least 2.

4. The apparatus as defined in claim 3, wherein the number of lenses, N, is an integer number in the range from 2 to about 9.

5. The apparatus as defined in claim 1, wherein the lenses are selected from light focusing elements including but not limited to ball lenses, thin lenses, GRIN lenses, and composite lenses.

6. The apparatus as defined in claim 1, wherein:
the lenses have closely similar focal lengths and each lens is spaced from a neighbouring lens along the first optical axis by a first length that is closely similar for each pair of neighbouring lenses,
the first lens is spaced from the first distal end of the source by a second length that is approximately one-half of the first length, and the second lens is spaced from the second distal end also by the second length.

7. The apparatus as defined in claim 6, wherein the lenses are spaced from neighbouring lenses by a length that is not greater than four times the focal length of each of the lenses.

8. The apparatus as defined in claim 1, wherein:
the lenses have closely similar focal lengths and lenses are spaced from neighbouring lenses by a regular pattern of spacings along the first optical axis so that successive lens are spaced from preceding lenses by a regular pattern of long spacings and short spacings, and
the first lens is spaced from the first distal end of the source by a length that is not larger than twice the focal length of said first lens and the second lens is spaced from the destination by a length that is not larger than twice the focal length of said second lens.

9. The apparatus as defined in claim 1, wherein:
the lenses comprise at least two sets of lenses, each lens in a set of lenses having substantially the same focal length, the first set of lenses including the first lens and the second lens, the N–2 fold plurality of third lenses including at least one second set of lenses,
each lens in the second set of lenses having a focal length longer than the focal length of each lens in the first set of lenses,
the lenses being spaced from each other in a regular pattern along the first optical axis,
the first lens being spaced from the first distal end of the source by a second length that is not greater than twice the focal length of the first lens, and the second lens being spaced from the second distal end by a similar second length, and
the spacing between neighbouring lenses each of which is a member of the second set of lenses being greater than a spacing between a lens from the first set of lenses and a neighbouring lens that is from the second set of lenses,
so that a light signal emitted from the first distal end of the source is continuously refocused by the succession of lenses and is focused at the second distal end of the destination;
thereby providing for optical communication between the source and the destination along the first optical channel.

10. The apparatus as defined in claim 1, wherein the source is a first distal end of a first optical fiber situated at and in optical communication with the first end of the first optical channel, and the destination is a second distal end of a second optical fiber situated at and in optical communication with the second end of the first optical channel.

11. The apparatus as defined in claim 6, wherein the lenses are ball lenses and the second length is about 5% less than one-half of the first length, so as to effect an improvement in the quality of the light signal transmitted along the first optical channel by reducing the impact of spherical aberration arising from the shape of the ball lenses.

12. The apparatus as defined in claim 11, wherein:
each of the lenses is situated axially along the first optical axis with a radial displacement that has a value no more than 1 percent of the diameter of each lens, and
each of the lenses is situated axially along the first optical axis with an axial displacement that has a value no more than 10 percent of the diameter of the lens, so as to optimize performance of the first optical channel for transmission of the optical signal.

13. The apparatus as defined in claim 1, wherein the apparatus is a microengineered apparatus for optical communications, manufactured by a process comprising a combination of micromachining and/or etching the shape of the movable portions and the base from a monolithic wafer.

14. The apparatus as defined in claim 13, wherein the monolithic wafer is a silicon crystal.

15. The apparatus as defined in claim 14, wherein the monolithic wafer comprises a first layer that is silicon, a second layer that is silica, and a third layer that is silicon.

16. The apparatus as defined in claim 1, wherein at least one optical device is situated between at least one of pairs of neighbouring lenses, to allow said optical device to perform one of processing and intercepting the light beam that is transmitted along the first optical channel, so as to perform a function that is selected from functions including monitoring, tapping, switching, filtering, and attenuating an optical signal emitted from the source.

17. An apparatus for transmitting an optical signal from a source to a destination, the apparatus having:
a body providing:
at least one first optical channel which is adapted for positioning in a space between a first end and a second end, such that in order for an optical signal beam to pass between the first end and the second end the optical signal beam must pass through the first optical channel;
the first end being in optical communication with one of the source and the destination;
the second end being in optical communication with the other of the source and the destination;
the optical channel having an N fold first plurality of lenses comprising a first lens, a second lens and an N–2 fold plurality of third lenses, where N is an integer at least 2,
the first lens being situated toward the first end of the first optical channel and spaced from the first distal end of the one of the source and the destination, the second lens being situated toward the second end of the first optical channel and spaced from the second distal end of the other of the source and the destination, and the third lenses being situated between the first lens and the second lens;
the lenses being axially situated at intervals along a straight line defining a first optical axis extending between the first end and the second end, so that the optical signal beam emitted from the first distal end of the source is repeatedly refocused along the first optical axis toward the destination, and is focused at the second distal end of the destination,
the lenses being selected from light focusing elements including ball lenses, thin lenses, GRIN lenses, and composite lenses, the lenses having closely similar focal lengths, and each lens is spaced from a neighbouring lens along the first optical axis by a first length that is closely similar for each pair of neighbouring lenses, the first lens is spaced from the first distal end of the source by a second length that is approximately one-half of the first length, and the second lens is spaced from the second distal end also by the second length, the lenses being spaced from neighbouring lenses by a length that is not greater than four times the focal length of each of the lenses;

thereby providing for optical communication between the source and the destination along the first optical channel, the apparatus being adapted so that the first optical channel operates in one of:

a unidirectional manner, in which the source must be at the first end and the destination must be at the second end of the first optical channel;

a reversible unidirectional manner, in which the source is selectively at one of the first end and the second end and the destination is at the other of the first end and the second end of the first optical channel; and a bi-directional manner in which there is a source and a destination at both of the first end and the second end of the first optical channel.

18. The apparatus as defined in claim 17, wherein:

the lenses are ball lenses;

the second length is about 5% less than one-half of the first length, so as to effect an improvement in the quality of the light signal transmitted along the first optical channel by reducing the impact of spherical aberration arising from the shape of the ball lenses;

each of the lenses is situated axially along the first optical axis with a radial displacement that has a value no more than 1 percent of the diameter of each lens; and each of the lenses is situated axially along the first optical axis with an axial displacement that has a value no more than 10 percent of the diameter of the lens, so as to optimize performance of the first optical channel for transmission of the optical signal.

19. The apparatus as defined in claim 17, wherein at least one optical device is situated between at least one of pairs of neighbouring lenses, to allow said optical device to perform one of processing and intercepting the light beam that is transmitted along the first optical channel, so as to perform a function that is selected from functions including monitoring, tapping, switching, filtering, and attenuating an optical signal emitted from the source.

20. An apparatus for transmitting an optical signal from a source to a destination, the apparatus having:

a body providing:

at least one first optical channel which is adapted for positioning in a space between a first end and a second end, such that in order for an optical signal beam to pass between the first end and the second end the optical signal beam must pass through the first optical channel;

the first end being in optical communication with one of the source and the destination;

the second end being in optical communication with the other of the source and the destination;

the optical channel having an N fold first plurality of lenses comprising a first lens, a second lens and an N−2 fold plurality of third lenses, where N is an integer at least 2, the first lens being situated toward the first end of the first optical channel and spaced from the first distal end of the one of the source and the destination, the second lens being situated toward the second end of the first optical channel and spaced from the second distal end of the other of the source and the destination, and the third lenses being situated between the first lens and the second lens;

the lenses being axially situated at intervals along a straight line defining a first optical axis extending between the first end and the second end, so that the optical signal beam emitted from the first distal end of the source is repeatedly refocused along the first optical axis toward the destination, and is focused at the second distal end of the destination, the lenses being selected from light focusing elements including ball lenses, thin lenses, GRIN lenses, and composite lenses, the lenses having closely similar focal lengths and lenses are spaced from neighbouring lenses by a regular pattern of spacings along the first optical axis so that successive lens are spaced from preceding lenses by a regular pattern of long spacings and short spacings, and the first lens being spaced from the first distal end of the source by a second length that is not larger than twice the focal length of each lens and the second lens being spaced from the destination also by said second length;

thereby providing for optical communication between the source and the destination along the first optical channel, the apparatus being adapted so that the first optical channel operates in one of:

a unidirectional manner, in which the source must be at the first end and the destination must be at the second end of the first optical channel;

a reversible unidirectional manner, in which the source is selectively at one of the first end and the second end and the destination is at the other of the first end and the second end of the first optical channel; and a bi-directional manner in which there is a source and a destination at both of the first end and the second end of the first optical channel.

21. The apparatus as defined in claim 20, wherein:

the lenses are ball lenses;

the second length is about 5% less than one-half of the first length, so as to effect an improvement in the quality of the light signal transmitted along the first optical channel by reducing the impact of spherical aberration arising from the shape of the ball lenses;

each of the lenses is situated axially along the first optical axis with a radial displacement that has a value no more than 1 percent of the diameter of each lens; and each of the lenses is situated axially along the first optical axis with an axial displacement that has a value no more than 10 percent of the diameter of the lens, so as to optimize performance of the first optical channel for transmission of the optical signal.

22. The apparatus as defined in claim 20, wherein at least one optical device is situated between at least one of pairs of neighbouring lenses, to allow said optical device to perform one of processing and intercepting the light beam that is transmitted along the first optical channel, so as to perform a function that is selected from functions including monitoring, tapping, switching, filtering, and attenuating an optical signal emitted from the source.

23. An apparatus for transmitting an optical signal from a source to a destination, the apparatus having:

a body providing:

at least one first optical channel which is adapted for positioning in a space between a first end and a second end, such that in order for an optical signal beam to pass between the first end and the second end the optical signal beam must pass through the first optical channel;

the first end being in optical communication with one of the source and the destination;

the second end being in optical communication with the other of the source and the destination;

the optical channel having an N fold first plurality of lenses comprising a first lens, a second lens and an N−2 fold plurality of third lenses, where N is an integer at least 2, the first lens being situated toward the first end of the first optical channel and spaced from the first distal end of the one of the source and the destination, the second lens being situated toward the second end of the first optical channel and spaced from the second distal end of the other of the source and the destination, and the third lenses being situated between the first lens and the second lens;

the lenses being axially situated at intervals along a straight line defining a first optical axis extending between the first end and the second end, so that the optical signal beam emitted from the first distal end of the source is repeatedly refocused along the first optical axis toward the destination, and is focused at the second distal end of the destination, the lenses being selected from light focusing elements including ball lenses, thin lenses, GRIN lenses, and composite lenses, the lenses comprising at least two sets of lenses, each lens in a set of lenses having substantially the same focal length, the first set of lenses including the first lens and the second lens, the N−2 fold plurality of third lenses including at least a second set of lenses, each lens in the second set of lenses having a focal length longer than the focal length of each lens in the first set of lenses, the lenses being spaced from each other in a regular pattern along the first optical axis, the first lens being spaced from the first distal end of the source by a second length that is not greater than twice the focal length of the first lens, and the second lens being spaced from the second distal end by a similar second length, and the spacing between neighbouring lenses each of which is a member of the second set of lenses being greater than a spacing between a lens from the first set of lenses and a neighbouring lens that is from the second set of lenses, so that a light signal emitted from the first distal end of the source is continuously refocused by the succession of lenses and is focused at the second distal end of the destination;

thereby providing for optical communication between the source and the destination along the first optical channel, the apparatus being adapted so that the first optical channel operates in one of:

a unidirectional manner, in which the source must be at the first end and the destination must be at the second end of the first optical channel;

a reversible unidirectional manner, in which the source is selectively at one of the first end and the second end and the destination is at the other of the first end and the second end of the first optical channel; and a bi-directional manner in which there is a source and a destination at both of the first end and the second end of the first optical channel.

24. The apparatus as defined in claim 23, wherein:

the lenses are ball lenses;

the second length is about 5% less than one-half of the first length, so as to effect an improvement in the quality of the light signal transmitted along the first optical channel by reducing the impact of spherical aberration arising from the shape of the ball lenses;

each of the lenses is situated axially along the first optical axis with a radial displacement that has a value no more than 1 percent of the diameter of each lens; and each of the lenses is situated axially along the first optical axis with an axial displacement that has a value no more than 10 percent of the diameter of the lens, so as to optimize performance of the first optical channel for transmission of the optical signal.

25. The apparatus as defined in claim 23, wherein at least one optical device is situated between at least one of pairs of neighbouring lenses, to allow said optical device to perform one of processing and intercepting the light beam that is transmitted along the first optical channel, so as to perform a function that is selected from functions including monitoring, tapping, switching, filtering, and attenuating an optical signal emitted from the source.

26. A method for transmitting an optical signal from a source to a destination, comprising:

providing an apparatus having:

a body providing:

at least one first optical channel which is adapted for positioning in a space between a first end and a second end, such that in order for an optical signal beam to pass between the first end and the second end the optical signal beam must pass through the first optical channel;

a source having a first distal end of a first optical fiber situated at the first end of the first optical channel, the source being in optical communication with the first end, and a destination having a second distal end of a second optical fiber situated at the second end of the first optical channel, the destination being in optical communication with the second end; and the first optical channel having an N fold first plurality of lenses comprising a first lens, a second lens and an N−2 fold plurality of third lenses, the first lens being situated toward the first end of the first optical channel and spaced from the first distal end of the source, the second lens being situated toward the second end of the first optical channel and spaced from the second distal end of the destination, and the third lenses being spaced at intervals between the first lens and the second lens;

the lenses being selected from light focusing elements including ball lenses, thin lenses, GRIN lenses, and composite lenses, the lenses being axially situated at intervals along a straight line defining a first optical axis extending between the first end of the first optical fiber and the second end of the second optical fiber, so that the optical signal beam emitted from the first end of the first optical fiber is regularly and repeatedly re-focused along the first optical axis, and, when the first optical channel is operated in the reverse direction, an optical signal beam emitted from a source at the second end similarly is repeatedly re-focused in the opposite direction along the first optical axis, so that a light signal emitted from the first distal end of the source is continuously refocused by the succession of lenses and is focused at the second distal end of the destination;

a first lens being situated toward the source and spaced by a second length from the first distal end of the first optical fiber, a second lens being situated toward the destination and spaced by the second length from the second distal end of the second optical fiber, the second length being approximately one-half of the first length;

emitting a light signal from the first distal end of the first optical fiber that is continuously refocused by the succession of lenses and is focused at the second distal end of the second optical fiber, thereby providing for transmission of said light signal from the source to the second communication channel;

the apparatus being adapted so that the first optical channel operates in one of:

a unidirectional manner, in which the source must be at the first end and the destination must be at the second end of the first optical channel;

a reversible unidirectional manner, in which the source is selectively at one of the first end and the second end and the destination is at the other of the first end and the second end of the first optical channel; and a bi-directional manner in which there is a source and a destination at both of the first end and the second end of the first optical channel.

27. The method as defined in claim 26, wherein the number of lenses, N, is an integer number at least 2.

28. The method as defined in claim 26, wherein the number of lenses, N, is an integer number in the range from 2 to about 9.

29. The method as defined in claim 26, wherein:

the lenses have closely similar focal lengths and each lens is spaced from a neighbouring lens along the first optical axis by a first length that is closely similar for each pair of neighbouring lenses, and the first lens is spaced from the first distal end of the source by a second length that is approximately one-half of the first length, and the second lens is spaced from the second distal end also by the second length.

30. The method as defined in claim 29, wherein the lenses are spaced from neighbouring lenses by a length that is not greater than four times the focal length of each of the lenses.

31. The method as defined in claim 26, wherein:

the lenses have closely similar focal lengths and lenses are spaced from neighbouring lenses by a regular pattern of spacings along the first optical axis so that successive lens are spaced from preceding lenses by a regular pattern of long spacings and short spacings, and the first lens is spaced from the first distal end of the source by a second length that is not larger than twice the focal length of each lens and the second lens is spaced from the destination also by said second length.

32. The method as defined in claim 26, wherein:

the lenses comprise sets of lenses, each lens in a set of lenses having substantially the same focal length, the first set of lenses including the first lens and the second lens, the N−2 fold plurality of third lenses including the second set of lenses, each lens in the second set of lenses having a focal length longer than the focal length of the lenses in the first set of lenses, the lenses being spaced from each other in a regular pattern along the first optical axis, the first lens being spaced from the first distal end of the source by a second length that is not greater than twice the focal length of the first lens, and the second lens being spaced from the second distal end by a second length that is not greater than the twice the focal length of the second lens, and the spacing between neighbouring lenses each of which is a member of the second set of lenses being greater than a spacing between a lens from the first set of lenses and a neighbouring lens that is from the second set of lenses, so that a light signal emitted from the first distal end of the source is continuously refocused by the succession of lenses and is focused at the second distal end of the destination;

thereby providing for optical communication between the source and the destination along the first optical channel.

33. The method as defined in claim 26, wherein the source is a first distal end of a first optical fiber situated at the first end of the first optical channel, and the destination is a second distal end of a second optical fiber situated at the second end of the first optical channel.

34. The method as defined in claim 26, wherein the lenses are ball lenses and the second length is about 5% less than one-half of the first length, so as to effect an improvement in the quality of the light signal transmitted along the first optical channel by reducing the impact of spherical aberration arising from the shape of the ball lenses.

35. The method as defined in claim 34, wherein each of the lenses is situated axially along the first optical axis with a radial displacement that has a value no greater than 1 percent of the diameter of the lens, so as to obtain optimum performance of the first optical channel for transmission of the optical signal.

36. The method as defined in claim 34, wherein each of the lenses is situated axially along the first optical axis with an axial displacement that has a value no greater than 10 percent of the diameter of the lens, so as to obtain optimum performance of the first optical channel for transmission of the optical signal.

37. The method as defined in claim 26, wherein the apparatus is a microengineered apparatus for optical communications, manufactured by a process comprising a combination of micromachining and/or etching the shape of the movable portions and the base from a monolithic wafer.

38. The method as defined in claim 37, wherein the monolithic wafer is a silicon crystal.

39. The method as defined in claim 37, wherein the monolithic wafer comprises a first layer that is silicon, a second layer that is silica, and a third layer that is silicon.

40. The method as defined in claim 26, wherein at least one optical device is situated between at least one of pairs of neighbouring lenses, to allow said optical device to perform one of processing and intercepting the light beam that is transmitted along the first optical channel, so as to perform a function that is selected from functions including monitoring, tapping, switching, filtering, and attenuating an optical signal emitted from the source.

* * * * *

UNITED STATES PATENT AND TRADEMARK OFFICE
CERTIFICATE OF CORRECTION

PATENT NO.    : 6,775,068 B2
DATED         : August 10, 2004
INVENTOR(S)   : S.J. Lomas et al.

It is certified that error appears in the above-identified patent and that said Letters Patent is hereby corrected as shown below:

<u>Title page,</u>
Item [73], Assignee, "BigBandwidth Inc.," should read -- BigBangwidth Inc., --
Item [56], References Cited, OTHER PUBLICATIONS, insert
-- Wilson, R. Gale, *Numerical Aperture Limits on Efficient Ball Lens Coupling of Laser Diodes to Single-Mode Fibers With Defocus to Balance Spherical Aberration*, 14 pages, Nov. 1994, NASA Technical Memorandum 4578. --

<u>Column 22,</u>
Line 21, "destination;" should read -- destination, --

Signed and Sealed this

Eleventh Day of January, 2005

JON W. DUDAS
*Director of the United States Patent and Trademark Office*